Figures 1, 2:
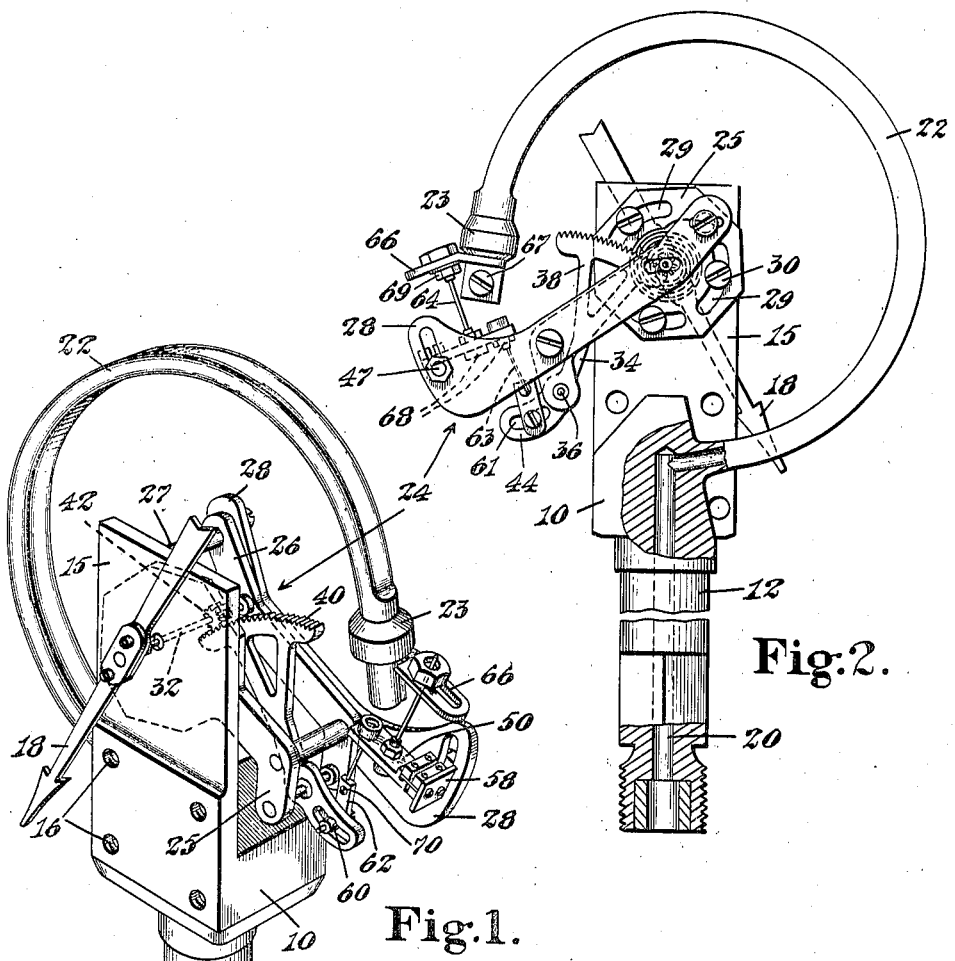

April 25, 1944.   R. U. ROURKE   2,347,341
PRESSURE GAUGE
Filed Oct. 27, 1942

INVENTOR
Robert U. Rourke
BY
Kenway & Witter
Attys.

Patented Apr. 25, 1944

2,347,341

UNITED STATES PATENT OFFICE 2,347,341

PRESSURE GAUGE

Robert Usher Rourke, Dudley, Mass., assignor to Waterhouse Company, Webster, Mass., a corporation of Massachusetts Application October 27, 1942, Serial No. 463,490

2 Claims. (Cl. 73—109)

This invention relates to pressure gauges and while it is of particular utility as embodied in gauges for indicating high pressures it may be advantageously applied to many gauges of other types.

In one aspect my invention is a satisfactory solution of a problem that has long baffled the pressure gauge industry, namely, the provision of a gauge actuated by a curved pressure member, such as a Bourdon tube, which may be relied upon to indicate high pressures, for example, 20,000 lb. per sq. in. and upwards, with accuracy for a satisfactory period of service. Heretofore, the flexing of the curved pressure member of such gauges when used to indicate moderate pressures has been well within the elastic limit of the material under stress and no permanent set occurs even after years of continuous service. On the other hand when a Bourdon tube of heavy construction is subjected to extremely high pressure it is disturbed to a degree that results in its taking a permanent set after a relatively short period of use. In actual practice it has been found necessary to replace gauges of the hitherto standard Bourdon tube type after less than a week of service in a 20,000 to 30,000 lb. range of pressures.

I have discovered that the difficulties above discussed may be obviated and a gauge provided that is reliable and accurate in operation under high pressure for long continued service by locating between the end of the Bourdon tube and the pointer operating mechanism a device for amplifying the pressure-responsive movement of the Bourdon tube. By this expedient the distortion and strain in the metal of the tube heretofore necessary in moving the pointer for the full dial range in indicating high pressure is substantially reduced and kept well within the elastic limit of the metal. In its more specific aspect the invention contemplates the employment of an intermediate arm accurately supported for oscillating movement by a resilient member serving as one element of a novel adjustable amplifying connection between the movable tube and the pointer and in cooperation therewith one or more resilient elements so fixedly connected at their ends in the connection that lag loss therethrough is entirely eliminated. Amplifying connections have been attempted many times by use of a simple lever to increase the motion where the lever at its fulcrum is supported by an ordinary metal sleeve bearing or on jeweled bearings to allow motion. In any such bearings there is friction present although it may be quite small. In other words, if the motion is upwards, for instance, the friction is a retarding force downward. When the motion is reversed so that the motion is downward the friction is a retarding force acting upward or against the motion. The reversing of the retarding friction, however small, shows up as lag in the indicating pointer, since a pressure gauge mechanism is one to duplicate the motion of the Bourdon tube by the motion of the pointer on a larger scale. By substituting a thin flexible strip of stainless steel or other resilient material the intermediate arm can be made to act in a perfectly resilient manner without any friction and without lag loss. A force is naturally required to deflect this spring member upwards for instance but when the force acts in the opposite direction the spring returns the arm exactly to its original position except for the loss of energy in internal molecular friction of the spring material, which to all practical purposes is infinitesimally small.

The object of the invention is to produce a superior construction of the above described nature and a more compact and improved assembly embodying a detachable frame for conveniently supporting the operating mechanism on the base of the gauge.

Figure 3:
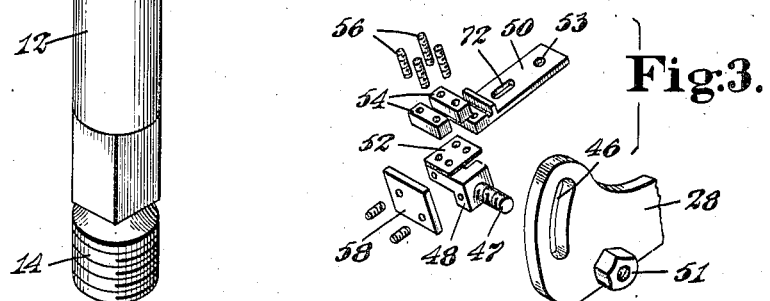

These and other features of the invention will be best understood and appreciated from the following description of a preferred embodiment thereof selected for purposes of illustration and shown in the accompanying drawing in which, Fig. 1 is a perspective view of my improved gauge, Fig. 2 is a rear elevation thereof, Fig. 3 is a detailed view of a portion of the device illustrated in exploded relation.

In the drawing 10 indicates the base of the gauge mounted on a post 12 screw threaded at 14. An upright plate 15 is either attached to or integral with the base and is screw threaded at 16 on its front face to receive and secure a graduated dial over which a pointer 18 is adapted to operate. A conduit 20 extends through the base 10 and post 12 and into and through a curved pressure-responsive member 22 fixed at one end to the base, the other end 23 of the member being closed and suspended for movement about the end supported on the base.

A frame 24, comprising plates 25 and 26 connected by spacers 27 and a plate 28 resting on the plate 26, is supported on the rear face of the plate 15. The plate 25 is slotted at 29 to receive three screws 30 threaded into the plate 15, the slots permitting rotary adjustment of the frame.

Mounted in the frame and projecting through the plate centrally of the slots 29 is a shaft 32 carrying the pointer 18. The construction of the pointer and its adjustable mounting on the shaft is fully described in my Patent No. 2,319,782 dated May 25, 1943.

Fluid pressure in the member 22 tends to straighten the member and move its free end 23 outwardly, such movement being in proportion to the pressure, and the following described mechanism and connections are provided between the free end of the member and the shaft 32 for rotating the shaft and the pointer thereon an amount proportional to such movement and in amplified degree carrying the pointer substantially through 270° for the maximum pressure movement of the member.

A lever 34 is pivoted to and between the plates 25 and 26 on a shaft 36, the longer arm 38 of the lever terminating in gear teeth 40 in mesh with the teeth of a pinion 42 fixed to the shaft 32. The shorter arm 44 of the lever is operatively connected to the free end 23 of the member 22 by the following described mechanism which not only amplifies the movement transmitted but furthermore functions with extreme accuracy and minimum friction.

One end of the plate 28 projects outwardly beyond the plates 25 and 26 and is slotted at 46 to receive the stud 47 of a block 48 on which is mounted for oscillating movement an arm 50, a locking nut 51 being threaded to the stud. This arm provides an intermediate amplifying connection between the end 23 of the tube and the arm 44 of the lever 34, and the novel manner of supporting this arm on a thin and flexible steel blade 52 causes the connection to operate with extreme precision and freedom. The blade 52 rests on the top surface of the block 48 and arm 50 and is secured in place by clamping blocks 54 held in place by screws 56, the assembly being further reinforced and covered by a plate 58. It will be apparent that the blade 52 secures the arm firmly and accurately to the block 48 and permits the arm to flex or oscillate up and down on the block, and that such lost motion as is bound to occur in a pivotal connection is wholly eliminated.

The arm 44 is connected to the free end of the arm 50 at 53 by a stud 60 adjustable in and along a slot 61 in the arm 44, a member 62 freely pivotal on the stud, and a short length 63 of piano wire connected at its ends to the member 62 and arm 50. The free end 23 of the tube 22 is connected to the arm 50, more adjacent to the blade 52, by a length 64 of piano wire attached at its ends to the arm and to a slotted bracket 66 secured to the tube end 23 by a screw 67. The ends of the wires are secured to the arm 50 and member 23 by collet chucks at 68 and 69 and to the member 62 by any convenient means such as solder or brazing at 70. In pressure gauges of this nature, as illustrated for example in patents, Nos. 1,499,657, 1,848,489 and 1,923,240, the free end of the Bourdon tube is connected to the pointer operating lever by pivoted links which produce not only an appreciable amount of friction but, furthermore and more important, a lag play in the connection which seriously affects the accuracy of the gauge, this defect being particularly objectionable in a gauge employing an amplifying connection. It will be apparent that such friction and lag are substantially eliminated where my flexible elements 63 and 64 are employed and fixedly connected at their ends as by the collet chucks.

It will be apparent that the above-described connection very substantially amplifies movement of the tube end 23 to the arm 38 and pointer 18 and the degree of amplification can be varied by adjusting the connections along the slots 61, 66 and 72. Furthermore, the piano wire together with the blade connection 52 and the freely pivotal member 62 provide a flexibility and accuracy in the connection that function freely and substantially without friction or lost motion. Adjustments will ordinarily be such as to move the pointer through substantially 270° for the maximum pressure movement of the tube end 23. The mounting of the pointer operating mechanism on the frame 24 which is bodily attached to the plate 15 is also of considerable advantage since it permits assembly and repair of such mechanism independently of and apart from the gauge.

Having thus disclosed my invention and described it in the best form now known to me, I claim as new and desire to secure by Letters Patent:

1. A pressure gauge comprising a pressure responsive member mounted for free movement at one end, a pointer movable about a fixed axis to indicate pressure, a pivoted member having one arm operatively connected to the pointer and a relatively shorter arm, an element supported for oscillating movement and disposed between the members, and means connecting the shorter arm of the pivoted member and the movable end of the pressure responsive member to said element, said means including a resilient element rigidly anchored at its ends to the pressure responsive member and the oscillating element respectively and another resilient element rigidly anchored at one end to the oscillating element and having its other end connected to the shorter arm of the pivoted member.

2. A pressure gauge comprising a pressure responsive member mounted for free movement at one end, a pointer movable about a fixed axis to indicate pressure, a pivoted member having one arm operatively connected to the pointer and a relatively shorter arm, an intermediate element, a flexible member fixedly connected to and mounting the intermediate element at one end for oscillating movement thereof thereabout, and means connecting the shorter arm of the pivoted member and the movable end of the pressure responsive member to the intermediate element, said means including two resilient elements each rigidly connected at one end to the intermediate element and connected at their other ends to the free end of the pressure responsive member and to the shorter arm of the pivoted member.

ROBERT U. ROURKE.